(12) United States Patent
Medles et al.

(10) Patent No.: US 8,750,359 B2
(45) Date of Patent: Jun. 10, 2014

(54) APPARATUS FOR MIMO CHANNEL PERFORMANCE PREDICTION

(71) Applicants: Abdelkader Medles, Royston (GB); Cyril Valadon, Herts (GB)

(72) Inventors: Abdelkader Medles, Royston (GB); Cyril Valadon, Herts (GB)

(73) Assignees: MStar Semiconductor Inc. (Cayman Islands), Grand Cayman (KY); MStar Software R&D (Shenzhen) Ltd., Shenzhen (CN); MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 13/628,218

(22) Filed: Sep. 27, 2012

(65) Prior Publication Data
US 2014/0072022 A1    Mar. 13, 2014

(30) Foreign Application Priority Data
Sep. 10, 2012  (EP) ..................................... 12183668

(51) Int. Cl.
*H04B 3/46*    (2006.01)
*H04B 17/00*   (2006.01)
*H04Q 1/20*    (2006.01)

(52) U.S. Cl.
USPC ........... 375/227; 375/340; 375/347; 375/267; 375/219; 455/70

(58) Field of Classification Search
CPC ............................ H04L 1/0054; H04B 17/006
USPC ................ 375/227, 340, 347, 267, 219, 232; 455/70
See application file for complete search history.

(56) References Cited

U.S. PATENT DOCUMENTS

| | | | |
|---|---|---|---|
| 2006/0205357 A1* | 9/2006 | Kim ................................. | 455/69 |
| 2006/0291600 A1* | 12/2006 | Tsai ............................... | 375/347 |
| 2007/0105503 A1* | 5/2007 | Kim ................................. | 455/70 |
| 2010/0296556 A1* | 11/2010 | Rave et al. ..................... | 375/219 |

OTHER PUBLICATIONS

Tang et al. (Taiwen Tang et al. "Mean Mutual Information Per Coded Bit based Precoding in MIMO-OFDM systems", 2010, IEEE, total of 5 pages).*

* cited by examiner

*Primary Examiner* — Sam K Ahn
*Assistant Examiner* — Fabricio R Murillo Garcia
(74) *Attorney, Agent, or Firm* — WPAT, PC; Justin King

(57) ABSTRACT

The invention describes a method for predicting the performance of the MLD receiver in MIMO channels. The method is based on the iterative principle where the performance of the MLD decoder is derived from that of an iterative receiver architecture with similar performance. The described Iterative MIMO Effective SNR (IMES) technique maps the performance of each MIMO channel realization into a set of effective SNR values for the different streams. This set of effective SNR values can then be used to provide link adaptation feedback to the transmitter so that the most suitable transmission format can be selected according to the characteristics of the propagation channel. Alternatively, this information can be used to adapt the receiver processing to the channel conditions, thereby making it possible, for example, to reduce the receiver power consumption in good signal conditions.

8 Claims, 10 Drawing Sheets

Conceptual Model of MIMO Iterative Decoder

Equivalent MIMO Effective SNR Mapping

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 8

APPARATUS FOR MIMO CHANNEL PERFORMANCE PREDICTION

FIELD OF THE INVENTION

The present disclosure relates to wireless communication systems and more particularly to techniques aimed at predicting the performance of the Maximum Likelihood Detection (MLD) receiver in Multiple Inputs Multiple Outputs (MIMO) channels. The techniques presented in this disclosure achieve good prediction accuracy with a limited complexity. The proposed MIMO channel MLD performance prediction techniques can be used to generate the feedback information required by link adaptation schemes. Alternatively, the performance prediction can be used to adapt the processing performed by the receiver to the characteristics of the propagation channel.

BACKGROUND OF THE INVENTION

MIMO processing is now being used in a wide range of wireless communication systems. The adoption of MIMO techniques has been driven by the need to provide ever increasing data throughput to ever increasing numbers of users whilst simultaneously improving the system spectral efficiency. MIMO processing enables improvements in data throughput and spectral efficiency by making it possible for the transmitter, often referred to as base-station or node-B in cellular systems, to simultaneously transfer multiple information streams to the user. At the receiver, different techniques can be used to retrieve the transmitted information. Linear Minimum Mean Square Error (LMMSE) processing is a commonly used technique. The LMMSE receiver provides a reasonably good estimation performance with a fairly low complexity cost. Nevertheless, the LMMSE approach is sub-optimum and it is often desirable to use solutions with a performance closer to that of the MLD receiver in order to maximise the efficiency of wireless communication systems using MIMO processing. Unfortunately, predicting the performance of the MLD receiver, or that of techniques with a performance close to that of the MLD receiver, is a very challenging task when MIMO channels are considered.

Link level performance prediction has traditionally been used for two main applications, namely system-level simulations and generation of channel quality measurement feedback for link adaptation. Pre-coding based MIMO techniques used in wireless communication standards such as Wi-Fi (IEEE 802.16m-2011, "*Amendment to IEEE Standard for Local and metropolitan area networks, Part 16: Air Interface for Broadband Wireless Access Systems—Advanced Air Interface*"), 3GPP WCDMA (3GPP TS 25.211, "*Physical Channels and Mapping of Transport Channels onto Physical Channels (FDD) (Release 7)*", V7.10.0) and 3GPP LTE (3GPP TS 36.211, "*Evolved Universal Terrestrial Radio Access (E-UTRA); Physical Channels and Modulation (Release 8)*", V8.9.0) require the link level performance predicted by the receiver to be fed-back to the transmitter in the form of a Channel Quality Indicator (CQI) metric (3GPP TS 36.213, "*Evolved Universal Terrestrial Radio Access (E-UTRA); Physical layer procedures (Release 8)*", V8.8.0). The CQI information is then used by the transmitter to adapt the transmission format to the propagation conditions. The overall objective of such a link adaptation mechanism is to select the transmission format with the best efficiency and with a high probability of the receiver correctly retrieving the information. The efficiency of different transmission formats is usually measured as spectral efficiency, but other metrics, such as power efficiency, may also be considered. The CQI will usually include information on the modulation and coding scheme that can be used by the transmitter in order to achieve a target receiver detection performance. The target receiver performance can be expressed through a number of different metrics such as Bit Error Rate (BER), Block Error Rate (BLER), and throughput, to name a few.

The aim of the link level performance prediction techniques presented in this disclosure is to predict or estimate the performance of the MLD receiver in a given MIMO channel through a set of Signal to Noise Ratios (SNR) values. Each stream in the MIMO system is associated with a different SNR which corresponds to the SNR at which the demodulation performance of the receiver would be achieved in an Additive White Gaussian Noise (AWGN) channel. These SNR values, also referred to as effective SNR values, can then be used to estimate the BER and/or BLER performance of the receiver in the given MIMO channel using mapping functions derived from the AWGN channel performance. These mapping functions are specific to the technique used by the receiver to retrieve the transmitted information. They can be generated through link-level simulations or can be derived theoretically and typically need to be matched to characteristics of the modulation and coding scheme used by the transmitter. The receiver can therefore use the effective SNR values to generate the CQI feedback by identifying at least one transmission format which will allow the target performance to be achieved. In wireless communication systems using Orthogonal Frequency Division Multiplexing (OFDM), as is the case for example in 3GPP LTE, multiple SNR values may be generated for the different sub-carriers. These multiple SNR values then typically need to be combined into a single SNR value from which it is possible to infer the receiver performance across the entire transmitted signal bandwidth.

Hence, the problem addressed in this disclosure can be expressed as that of predicting the performance of the receiver in a given MIMO channel. This is relatively simple to achieve when the receiver implements the LMMSE equalizer. However, the problem of predicting the performance of the MLD receiver in a MIMO channel is a more complex one. The joint decoding of the multiple symbols transmitted by the different streams makes it difficult to come up with a simple metric that accurately predicts the decoding performance across all the transmitted streams. Moreover, it is highly desirable to limit the computational complexity of the performance prediction technique in order to enable real-time processing in receivers where stringent cost and power limitations may apply. When applied to the generation of the CQI values used to support link adaptation, the performance prediction techniques also need to be able to achieve good accuracy over the whole range of transmission formats supported by the transmitter. Different transmission formats will typically use different modulation schemes as well as different error correction coding rates and the performance prediction accuracy needs to be maintained across all the formats.

Several attempts have been made previously to derive mapping functions for the generation of effective SNR values in MIMO channels. These attempts have usually been derived by extending to the MIMO channel approaches originally designed for single transmit antenna systems (see for example R. Yaniv, et al., "*CINR Measurement using the EESM method*", IEEE C802.16e-05/141r1, March 2005; K. Sayana, J. Zhuang, K. Stewart, Motorola Inc, "*Link Performance Prediction based on Mean Mutual Information per Bit (MMIB) of the LLR Channel [S]*". May 2, 2007). Unfortunately these different techniques suffer from a number of limitations. First, these methods are not general since they assume that the same constellation is used on all the streams (H. Liu, L. Cai, H. Yang, D. Li, *EESM Based Link Error Prediction for Adaptive MIMO-OFDM System*, In Proc. *Vehicular Technology Conference*, 2007. *VTC2007-Spring. IEEE 65$^{th}$* 22-25 Apr. 2007, pp. 559-563; K. Sayana, J. Zhuang, K. Stewart. "*Short Term Link Performance Modeling for ML Receivers with Mutual Information per Bit Metrics*", In Proc. GLOBECOM, 2008, pp. 4313-4318). Hence, these techniques cannot be applied to systems where different modulation schemes are used for the different streams. Moreover, the lack of a solid theoretical foundation for these different techniques leads to the need for complex look-up tables derived from link-level performance simulations.

Both the Mean Mutual Information per Bit (MMIB) and the Received Block Information Rate (RBIR) approaches require complex eigenvector decompositions in order to estimate the performance of the MLD receiver in MIMO channels and only achieve limited performance accuracy. The alternative Exponential Effective SNR Mapping (EESM) method has also been shown to lead to large inaccuracies when used to predict the performance of the MLD receiver in MIMO channels. When applied to MIMO channels, both EESM and MMIB techniques assume joint encoding of the MIMO streams and therefore predict the MLD performance as a single metric common to the different streams. Hence, these techniques cannot be used when the different streams are generated and encoded independently. An extension to the RBIR method, referred to as Extended RBIR (ERBIR), has recently been proposed for MIMO channels (J. Zhang, H. Zheng, Z. Tan, Y. Chen, L. Xiong, "*Link Evaluation for MIMO-OFDM System with ML Detection*", In Proc. IEEE *International Conference on Communication (ICC)* 2010). This method is still limited to configurations where identical modulation schemes are used for the different streams and hence isn't suitable for a number of applications. For example, the 3GPP LTE standard supports the transmission of streams with different modulation schemes and hence the ERBIR approach couldn't be applied for the CQI generation in cellular communication systems following the 3GPP LTE standard. Moreover, whilst the ERBIR approach shows good prediction accuracy, it suffers from a very high computational complexity. This is due to the need for the calculation of the exact average mutual information in the form of integral formulas that are channel and constellation dependent.

Finally, the different prior-art techniques usually assume frequency-domain multiplexing and rely on averaging channel realizations in the frequency domain to achieve a good prediction performance. Hence, the accuracy of these approaches is low in propagation channels with limited frequency diversity.

The invention described herein provides techniques for the prediction of the MLD receiver performance in MIMO channels. The techniques presented in this disclosure achieve good accuracy with a limited complexity. These methods calculate an effective SNR which represents the SNR in the AWGN channel which would lead to the same demodulation performance as that experienced in the MIMO channel. The methods presented in this document can be used in systems where different modulation schemes are transmitted on the multiple MIMO streams and do not make on any assumption on the error correction coding. The predicted receiver performance can be used to generate link adaptation feedback as well as to adapt the receiver processing to the characteristics of the propagation link.

SUMMARY OF THE INVENTION

The embodiments of the invention described herein provide methods predicting the performance of the MLD receiver in MIMO channels. An iterative principle is used so that the performance of the MLD decoder is derived from that of an iterative receiver architecture with similar performance. An Iterative MIMO Effective SNR (IMES) technique maps the performance of each MIMO channel realization into a set of effective SNR values for the different streams. This set of effective SNR values can then be used to provide link adaptation feedback to the transmitter so that the most suitable transmission format can be selected according to the characteristics of the propagation channel. Alternatively, this information can be used to adapt the receiver processing to the channel conditions, thereby making it possible, for example, to reduce the receiver power consumption in good signal conditions.

According to the IMES approach presented in this document, the performance of the MLD receiver in MIMO channels is predicted by using a model of an iterative receiver. The model iterative receiver iterates processing of the received signal between an equalization unit and a soft-demapping unit. The final SNR values calculated for the different MIMO streams at the output of the equalizer can then be used to characterize the performance of the MLD receiver.

The equalization unit uses estimates of the propagation channels and of the noise covariance matrix in order to process the received signal and mitigate the effect of the propagation link. The equalized signal is then passed to the soft-demapping unit which estimates the transmitted information bits according to the modulation constellation used by the transmitter. The multiple iterations improve the quality of the estimates generated by these two units by making use of a-priori information passed between the two processing stages. Typically, the equalizer will provide the soft-demapper with estimates of the output SNR for each MIMO stream. The soft-demapping unit will in turn generate estimates of the mean and variance for the constellation symbols as inputs to the equalization unit.

The IMES approach estimates the SNR at the output of the equalizer that would be achieved at the final iteration but doesn't actually process the received signal. According to the IMES approach, an equalizer SNR estimation unit calculates the SNR at the output of the equalizer from knowledge of the propagation channel, noise covariance matrix and variance of the transmitted constellation symbols. These SNR values are then used by a soft-demapper variance estimation unit to update the constellation symbol variance estimates. Multiple iterations are then performed between these two units to generate the set of final effective SNR values.

In one embodiment of the invention, the effective SNR values are used to generate link adaptation feedback used by the transmitter for downlink scheduling decisions and transmission format selection. This feedback is typically in the form of CQI values which are used to select the modulation scheme and coding rate from a table of pre-defined formats. An efficient search approach is presented in order to reduce the overall complexity associated with the generation of the CQI information. This approach exploits characteristics of the CQI table so as to limit the number of effective SNR values that need to be calculated during the search performed over the set of possible modulation schemes for the different MIMO streams.

In a further embodiment of the invention, the effective SNR values are used to adapt the receiver processing to the link characteristics by way of demodulator selection. The receiver may implement multiple demodulation architectures, each having different characteristics in terms of computational performance and estimation accuracy. For a given MIMO channel realization, it is possible to compare the set of effective SNR values in order to select the demodulation architecture which will provide the required estimation performance with the lowest computational complexity. By doing so, it is possible to reduce the computational complexity of the receiver in good signal conditions. As a result of this, the proposed approach can provide power consumption benefits over prior-art solutions.

When the transmission is performed over a propagation link characterized by multiple MIMO channel realizations, it is possible to generate a single set of effective SNR values representative of the MLD performance across the whole propagation link by combining the IMES approach with prior-art techniques such as MMIB, RBIR, and EESM. This can be the case when frequency division multiplexing is used. The performance across the entire signal bandwidth can be predicted by first calculating multiple sets of effective SNR values for different portions of the signal bandwidth and then combining the different values within one set into a single value using existing mapping techniques such as MMIB, RBIR, or EESM.

The IMES method can be used for the link performance prediction evaluation of different MIMO techniques, such as space-time coding, beam-forming and spatial multiplexing with channel linear pre-coding, by considering the effective MIMO channel experienced by the different streams corresponding to the combination of the pre-coding and the physical channel.

BRIEF DESCRIPTION OF THE DRAWINGS

For a better understanding of the present invention, reference is made, by way of example, to the following drawings. It is to be noted, however, that the appended drawings illustrate only typical embodiments and are not to be considered limiting of its scope.

FIG. 8 shows a table of the CQI values as defined by the 3GPP LTE standard.

DESCRIPTION OF EXAMPLE EMBODIMENTS

The embodiments of the invention described herein provide techniques for the prediction of the MLD receiver performance in MIMO channels. These techniques offer good estimation accuracy with limited complexity. The MIMO link prediction methods described herein are based on the per-stream MLD BER and involve the calculation of an effective SNR for each MIMO stream. Each individual SNR value corresponds to the SNR for which the same receiver performance would be achieved in an AWGN channel. It should be noted that the application of the techniques presented herein isn't limited to the cases where the receiver implements a MLD solution. These techniques are suitable for any receiver implementation, as long as the associated demodulation performance is reasonably close to that of the full MLD approach.

Figure 1:
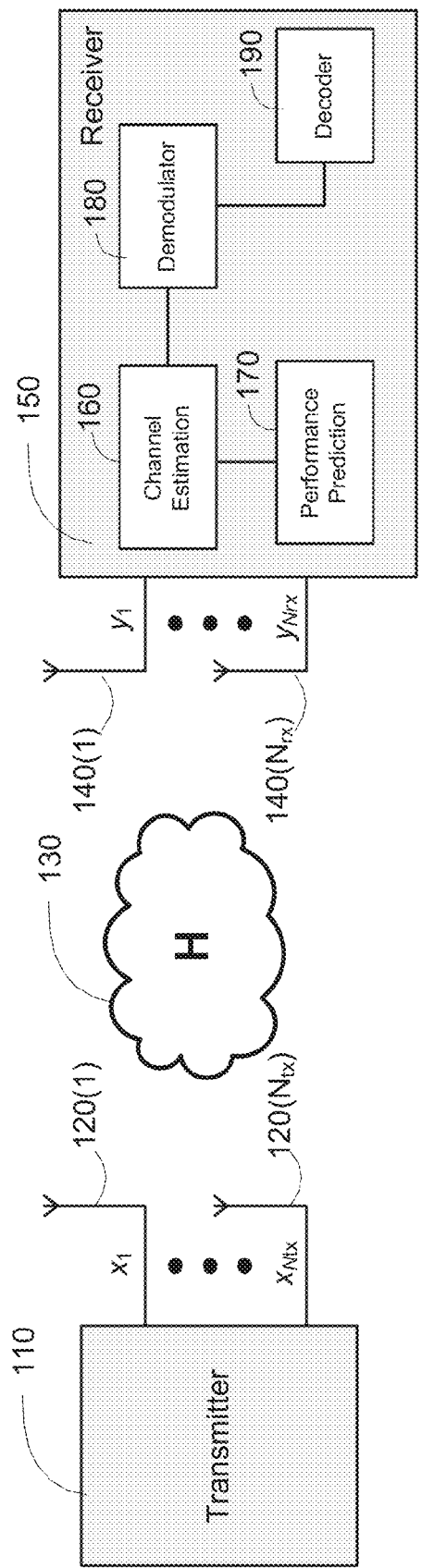
FIG. 1 shows a simplified block diagram of a typical MIMO system highlighting the performance prediction in the receiver.

FIG. 1 shows a simplified block diagram of a typical MIMO system comprising a transmitter 110 and receiver 150. The transmitter and receiver comprise a plurality of antennas 120(1)-120($N_{tx}$) and 140(1)-140($N_{rx}$) respectively communicating over the MIMO propagation channel 130. The propagation channel can be modelled as an $N_{rx} \times N_{tx}$ matrix H where the different entries in the matrix correspond to the different links between the multiple transmitter antennas and the multiple receiver antennas. In order to help the receiver 150 estimate the propagation channel, the transmitter 110 will typically transmit reference signal symbols. The channel estimation unit 160 can use these reference signal symbols, which are known a-priori, to estimate the different entries in the propagation channel matrix H. Alternatively, in the absence of reference signal symbols, it is possible for the channel estimation unit 160 to use blind estimation techniques. The channel estimation unit 160 also estimates the received noise covariance matrix. The estimated propagation channel matrix H and the noise covariance matrix are then used by performance prediction unit 170 in order to predict the performance of the demodulation unit 180 which is tasked with retrieving the information transmitted by transmitter 110. The demodulation unit provides estimates of the coded information bits transmitted by transmitter 110. The Forward Error Code (FEC) decoder unit 190 then uses these estimates to retrieve the user information. The estimates of the coded information bits may be provided to the decoder unit 190 in the form of Log-Likelihood Ratio (LLR) values.

Figure 2:
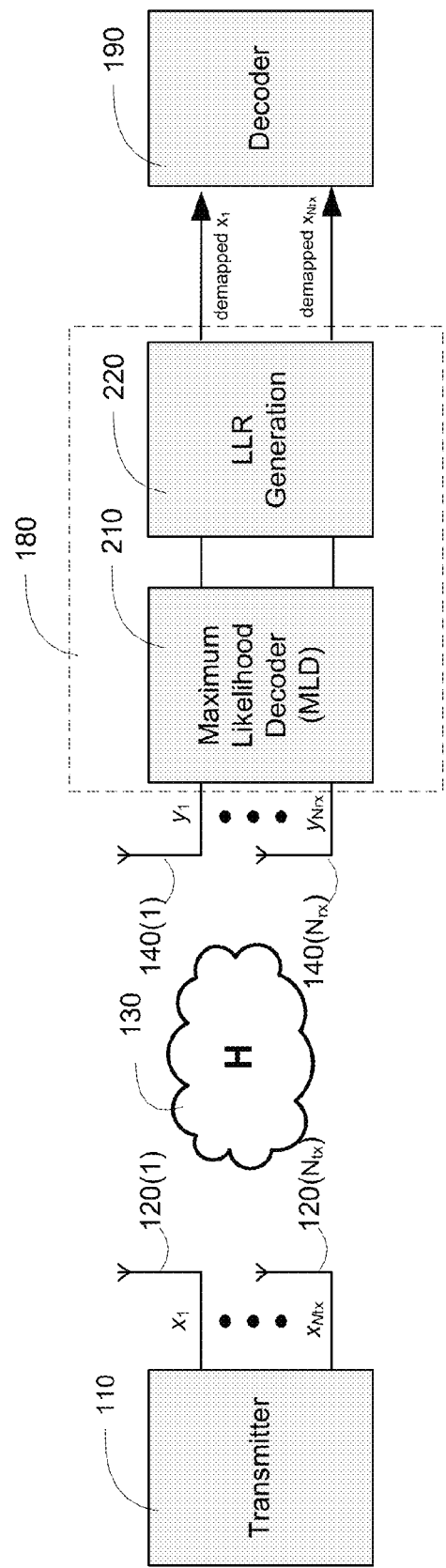
FIG. 2 shows a simplified block diagram for the MIMO MLD performance prediction.

FIG. 2 illustrates the desired operation for the performance prediction unit 170. The demodulation unit 180 can be modelled with a MLD processing unit 210 which provides estimates to the LLR generation unit 220. The aim of the performance prediction unit 170 is to predict the performance of the receiver at the output of the MLD unit 210.

Since the proposed performance prediction methods treat the different streams independently, they are applicable to systems where the different MIMO streams are encoded and decoded separately, as well as to systems where the encoding and decoding jointly process the different streams. It is also to be noted that any linear channel pre-coding, such as space-time encoding, linear pre-coding for spatial multiplexing or beam forming can easily be absorbed into an equivalent overall MIMO channel.

The received signal can be modelled as follows:

$$Y = \mathcal{H}X + V \qquad \text{Equation 1}$$

where $$Y = \begin{bmatrix} y_1 \\ \vdots \\ y_{N_{rx}} \end{bmatrix}$$

is the vector representing the received signal and $$X = \begin{bmatrix} x_1 \\ \vdots \\ x_{N_{tx}} \end{bmatrix}$$

is the vector representing the $N_{tx}$ transmitted streams $x_n$, $n=1,\ldots,N_{tx}$. It is assumed in this example that the number of MIMO streams is equal to the number of transmitter antennas. It will however be obvious to the person skilled in the art that, in the case of the use of a pre-coder, the techniques presented herein can also be applied to cases where the number of MIMO streams is different to $N_{tx}$. Different modulation schemes can be used for the transmission of the different MIMO stream signals. Each modulation scheme is characterized by its modulation order $Q_n$, $n=1,\ldots,N_{tx}$ and constellation size $M_{Q_n}$, $n=1,\ldots,N_{tx}$. The transmitted signal power may also vary across the different streams and is denoted as $\sigma_n^2$, $n=1,\ldots,N_{tx}$.

The MIMO channel 130 is modelled with the following matrix:

$$H = \begin{bmatrix} H_{1,1} & \cdots & h_{1,N_{tx}} \\ \vdots & \ddots & \vdots \\ h_{Nrx,1} & \cdots & h_{N_{rx},N_{tx}} \end{bmatrix} = [h_1 \ \ldots \ h_{N_{tx}}] \qquad \text{Equation 2}$$

where $h_{k,n}$ is the complex channel gain from transmit antenna n to receive antenna k.

$$h_n = \begin{bmatrix} h_{1,n} \\ \vdots \\ h_{N_{rx},n} \end{bmatrix}$$

is the vector representing the different channel complex gains from transmit antenna n to each of the $N_{rx}$ receive antennas. In the presence of linear pre-coding, the channel matrix $\mathcal{H}$ represents the equivalent overall MIMO channel resulting from the combination of the linear pre-coder and the physical MIMO channel.

In Equation 1, $$V = \begin{bmatrix} v_1 \\ \vdots \\ v_{N_{rx}} \end{bmatrix}$$

denotes the AWGN samples. It is assumed that the associated variance $\sigma_v^2$ is the same for all the receive antennas. In cases where either the noise covariance matrix $R_v$ is not diagonal or the noise power varies across the different receiver antennas, a whitening matrix multiplication, by $R_v^{-1/2}$ can be applied to bring the problem back to the white noise case with an equivalent channel $R_v^{-1/2}H$.

The average received signal power is defined as:

$$\bar{P} = \frac{E\left(\sum_{n=1}^{N_{tx}} \sigma_n^2 \|h_n\|^2\right)}{N_{rx}} \qquad \text{Equation 3}$$

where $\|h_n\|$ is the $L^2$ norm of $h_n$, and $E(A)$ denotes the expectation of A.

At the receiver, the hard decision maximum likelihood decoding unit 210 estimates the transmitted signal using the following equation:

$$X^{MLD} = \min_{x_1 \in \chi_1, \ldots, x_{N_{tx}} \in \chi_{N_{tx}}} \|Y - \mathcal{H}X\|^2$$

Equation 4
where $\chi_n$ is the constellation corresponding to the modulation order $Q_n$.

The processing performed by the MLD unit 210 corresponds in effect to an exhaustive search over the multi-dimensional constellation of the transmitted signal. It is therefore be obvious that the implementation of the MLD will usually be complex unless the number of MIMO streams and the modulation order of the different streams are both kept to low values. Given the complexity associated with the generation of the MLD decisions in MIMO channels, it is clear that predicting the performance of a receiver implementing such architecture will be a complex task, especially when tight computational complexity constraints are set. According to the invention, the performance of the MIMO MLD receiver is predicted by estimating the performance of an iterative MIMO decoder.

Figure 3:
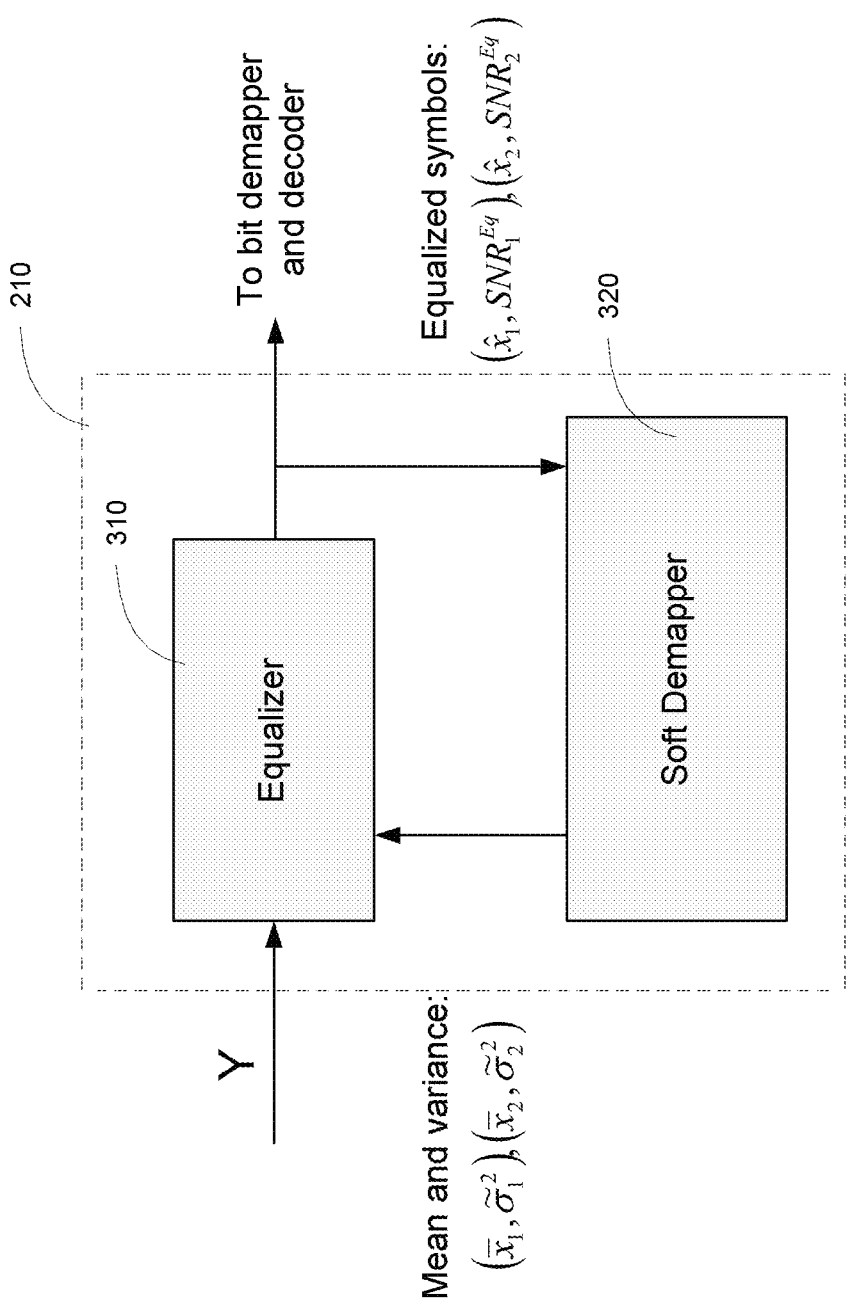
FIG. 3 shows a block diagram of the conceptual model of a MIMO iterative decoder.

FIG. 3 shows a block diagram for a MIMO receiver based on the iterative principle. The iterative principle is a well-known approach and can be applied to techniques used to solve a large variety of problems. Examples of solutions based on the iterative principle include the Turbo decoder (D. Divsalar, S. Dolinar, F. Pollara, "*Iterative turbo decoder analysis based on density evolution*". IEEE Journal on Selected Areas in Communications (JSAC), vol. 19, no. 5, pp. 891-907, May 2001), bit-interleaved coded modulation (X. Li and J. A. Ritcey, "*Bit-interleaved coded modulation with iterative decoding*", IEEE Commun. Letters, vol. 1, no. 6, pp. 169-171, November 1997) and MIMO sphere decoding (H. Vikalo, et al., "*Iterative decoding for MIMO channels via modified sphere decoding*"; IEEE Transactions on Wireless Communications, vol. 3, No. 6, November 2004).

In the iterative MIMO receiver presented in FIG. 3, iterations are performed between the MIMO equalization unit 310 and the soft-demapping unit 320. The iterative equalize and de-map principle followed by this receiver is very similar to belief propagation (X. Yang, Y. Xiong, F. Wang, "*An adaptive MIMO system based on unified belief propagation detection*", In Proc. IEEE International Conference on Communication (ICC) 2007, June 2007) with the difference that the messages being exchanged are in the form of post demapper mean and variance instead of marginal bit probabilities. The soft-demapper unit 320 exploits knowledge of the transmitted symbol constellations to extract more information about the signal in the form of mean and variance. This information is then used to improve the design of the equalizer. The processing is then iterated between the equalizer unit 310 and the soft-demapper unit 320 in order to improve the reliability of the decisions which are finally provided to the LLR generation unit 220.

The equalizer unit 310 processes the received signal vector Y and generates, at each iteration, estimates of the modulation symbols transmitted over the different streams. These estimates can be expressed in vector notation as:

$$\hat{X} = \begin{bmatrix} \hat{x}_1 \\ \vdots \\ \hat{x}_{N_{tx}} \end{bmatrix} \quad \text{Equation 5}$$

The different entries $\hat{x}_n$, n=1, ..., $N_{tx}$ in the vector above correspond to the estimates for the different MIMO streams.

Different solutions can be used for the processing implemented by the equalizer to generate the vector of estimated transmitted symbols. For example, it is possible to implement unit 310 as an Unbiased Whitening Matched Filter (UWMF) equalizer. The Unbiased Whitening Matched Filter linear equalizer is derived assuming that the contribution of the interfering streams, calculated using the per stream post soft-demapper means, has been removed. This assumption leads to the following equalizer formula for stream n:

$$Eq_n = \frac{1}{g_n h_n} g_n \quad \text{Equation 6}$$

with $$g_n = h_n^H \left( \bar{H}_n \tilde{\Sigma}_n \bar{H}_n^H + \sigma_v^2 I \right)^{-1}$$

The elements in the diagonal matrix $\tilde{\Sigma}_n$ with elements correspond to the error variance of the soft-demapper output from the previous iteration for the interfering streams, i.e. $\tilde{\Sigma}_n$=diag $(\tilde{\sigma}_1^2, \ldots, \tilde{\sigma}_{n-1}^2, \tilde{\sigma}_{n+1}^2, \ldots, \tilde{\sigma}_{N_{tx}}^2)$. $\bar{H}_n = [h_1, \ldots, h_{n-1}, h_{n+1}, \ldots, h_{N_{tx}}]$ is the sub-channel matrix corresponding to the interfering streams contribution.

The UWMF equalizer output corresponding to the estimate of stream $x_n$ is:

$$\hat{x}_n = Eq_n(y - \bar{H}_n \bar{x}_n) \quad \text{Equation 7}$$

The term in brackets corresponds to the cancellation of the a-posteriori mean of the interference with $\bar{x}_n = [\bar{x}_1, \ldots, \bar{x}_{n-1}, \bar{x}_{n+1}, \ldots, \bar{x}_{N_{tx}}]^T$.

At each iteration of the iterative MIMO receiver, the equalizer also provides the soft-demapper 320 with estimates of the output SNR for each MIMO stream. These SNR values, denoted as $SNR_n^{Eq,(I)}$, n=1, ..., $N_{tx}$, are calculated according to the formula of the SNR at the output of the assumed equalizer. The SNR for the UWMF equalizer can be expressed as:

$$SNR_n^{Eq} = \sigma_n^2 h_n^H \left( \bar{H}_n \tilde{\Sigma}_n \bar{H}_n^H + \sigma_v^2 I \right)^{-2} h_n \quad \text{Equation 8}$$

$$= \frac{\sigma_n^2}{\sigma_v^2} \left[ \|h_n\|^2 - h_n^H \bar{H}_n \left( \sum_n \bar{H}_n^H \bar{H}_n + \sigma_v^2 \right)^{-1} \sum_n \bar{H}_n^H h_n \right]$$

Whereas the formula of the SNR in the first line of the above equation involves a $N_{rx} \times N_{rx}$ matrix inversion, the second line corresponds to a $(N_{tx}-1) \times (N_{tx}-1)$ matrix inversion. In the case of a full rank channel ($N_{rx} \geq N_{tx}$), the second line formulation corresponds to a lower complexity and will usually be preferred for implementation.

For MIMO systems with two transmit antennas, the SNR formulae can be further simplified as:

$$SNR_1^{Eq} = \frac{\sigma_1^2}{\sigma_v^2} \left[ \|h_1\|^2 - \frac{\tilde{\sigma}_2^2 |h_1^H h_2|^2}{\sigma_v^2 + \tilde{\sigma}_2^2 \|h_2\|^2} \right]$$

$$SNR_2^{Eq} = \frac{\sigma_2^2}{\sigma_v^2} \left[ \|h_1\|^2 - \frac{\tilde{\sigma}_1^2 |h_1^H h_2|^2}{\sigma_v^2 + \tilde{\sigma}_1^2 \|h_1\|^2} \right]$$

The soft-demapper generates information on the transmitted modulation symbols that is used at the next iteration of the equalizer in order to improve the quality of the decisions. This information takes the form of a-posteriori mean and variance of the transmitted modulated symbols. The soft-demapper 320 typically assumes that the noise $v_n$ at the output of the equalizer is additive Gaussian with zero mean and variance $$\frac{1}{SNR_n^{Eq}}.$$

Under this assumption, the output of the soft-demapper can be characterized by the following set of mean and variance values associated with the different streams:

$$\bar{x}_n = E(x_n / \hat{x}_n) = \frac{\sum_{p \in \chi_n} \sigma_n p \exp\left(-SNR_n^{Eq} \left| \frac{\hat{x}_n}{\sigma_n} - p \right|^2\right)}{\sum_{p \in \chi_n} \exp\left(-SNR_n^{Eq} \left| \frac{\hat{x}_n}{\sigma_n} - p \right|^2\right)} \quad \text{Equation 10}$$

$$\tilde{\sigma}_n^2 = E(|x_n - \bar{x}_n|^2) = \sigma_n^2 E_v \quad \text{Equation 11}$$

$$\left( \frac{1}{M_{Q_n}} \sum_{q \in \chi_n} \left| q - \frac{\sum_{p \in \chi_n} p \exp\left(-\left|\sqrt{SNR_n^{Eq}}(q-p) + v\right|^2\right)}{\sum_{p \in \chi_n} \exp\left(-\left|\sqrt{SNR_n^{Eq}}(q-p) + v\right|^2\right)} \right|^2 \right)$$

where the expectation $E_v$ is taken with respect to the standard complex normal variable v and |A| is the norm-2 of the complex number A.

It can easily be understood from the description of the different processing steps that the implementation of the MIMO iterative decoder is highly complex. For example, the calculation of the a-posteriori mean probabilities $\bar{x}_n$ require non-linear operations and hence will be difficult to implement. Hence, the complexity of the MIMO iterative decoder will be prohibitive for most applications. However, predicting the performance of the MIMO iterative decoder is a reasonably simple task to perform. Hence, according to the invention the performance of the MIMO iterative decoder is used to predict the performance of the MIMO MLD receiver.

Figure 4:
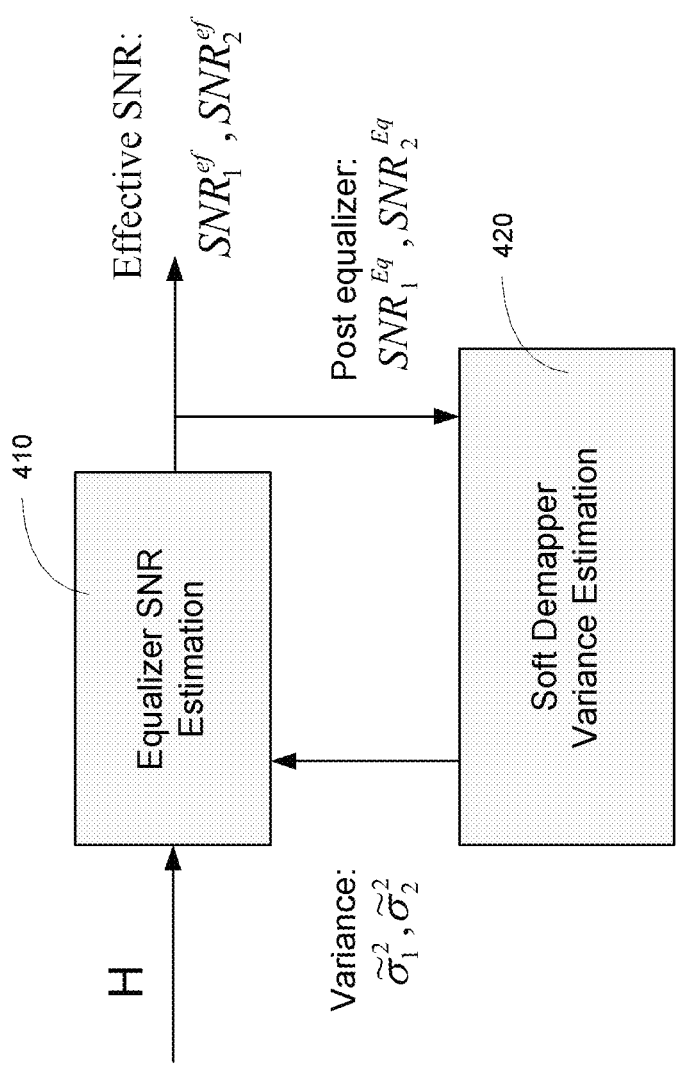
FIG. 4 shows a block diagram of the equivalent MIMO effective SNR mapping.

FIG. 4 presents the different processing steps required in the estimation of the performance of the MIMO iterative receiver. Unsurprisingly, it can be seen that there is a very high similarity in the processing steps required for the performance estimation with those required for the implementation of a MIMO iterative decoder.

The equalizer SNR estimation unit 410 maps to the equalizer unit 310 in FIG. 3 and calculates the SNR experienced at the output of the equalizer. Hence, it can be seen that the processing performed by 410 will be very similar to that of 310 but will be simpler since 410 only needs to estimate the SNR at the output of the equalizer but doesn't actually process the received signal.

Similarly, the soft-demapper variance estimation unit 420 maps to the soft-demapper unit 320 in FIG. 3 and calculates the a-posteriori variance of the transmitted symbols. The processing to be performed is simpler than that of 320 since the a-posteriori mean values $\bar{x}_n$ which are difficult to generate do not need to be computed in 420. This is due to the fact that neither the SNR coefficients nor the SNR at the output of the equalizer depend on these quantities.

The calculation of the a-posteriori variance only depends on the SNR and hence can be implemented with a fairly low complexity. The a-posteriori variance can be expressed as:

$$\tilde{\sigma}_n^2 = \sigma_n^2 f_{Q_n}^{DeMap}(SNR_n) \qquad \text{Equation 12}$$

$\sigma_n^2$ denotes the constellation power and $f_{Q_n}^{DeMap}(SNR)$ maps the SNR to the a-posteriori normalized variance of the soft-demapper. This mapping function can be calculated as follows:

$$f_{Q_n}^{DeMap}(SNR) = \qquad \text{Equation 13}$$

$$E_v\left(\frac{1}{M_{Q_n}}\sum_{q \in \chi_n}\left|q - \frac{\sum_{p \in \chi_n} p\exp(-|\sqrt{SNR}(q-p)+v|^2)}{\sum_{p \in \chi_n} \exp(-|\sqrt{SNR}(q-p)+v|^2)}\right|^2\right)$$

The mapping function can also be expressed in analytical form as:

$$f_{Q_n}^{DeMap}(SNR) = \int\int_{tw} \frac{1}{\pi M_{Q_n}} \qquad \text{Equation 14}$$

$$\sum_{q \in \chi_n}\left|q - \frac{\sum_{p \in \chi_n} p\exp(-|\sqrt{SNR}(q-p)+t+iw|^2)}{\sum_{p \in \chi_n} \exp(-|\sqrt{SNR}(q-p)+t+iw|^2)}\right|^2$$

$$\exp(-(t^2+w^2))\delta t \delta w$$

where t denotes the real part of the noise, w denotes the imaginary part of the noise, and i denotes the imaginary number $i=\sqrt{-1}$.

The analytical form of Equation 14 corresponds to cases where complex constellations are used. Similar formula can be derived for real constellations such as Binary Phase-Shift Keying (BPSK).

The average a-posteriori variance function $f_{Q_n}^{DeMap}$ is dependent on the modulation constellation. In order to reduce the implementation complexity, $f_{Q_n}^{DeMap}$ can be pre-computed using Equation 14 for the different possible input constellations and across the range of useful SNR values which will typically be from −10 dB to 30 dB. The results can then be stored in look-up tables and used for the effective SNR calculation.

Hence, according to the IMES approach for the MIMO receiver performance prediction, iterations are performed between the equalizer SNR estimation unit 410 and the soft-demapper variance estimation unit 420 in order to generate a final set of effective SNR values for the different streams.

The IMES algorithm for the MIMO effective SNR calculation can therefore be summarized as follows:

Iteration 1:
Calculate initial transmitted symbol variance estimates according to:

$$\tilde{\sigma}_n^2 = \beta_{Q_n}\sigma_n^2, n=1,\ldots,N_{tx}$$

Calculate the first set of SNR values for the equalizer output of each MIMO stream according to the selected equalizer design:

$$SNR_n^{Eq,(1)}, n=1,\ldots,N_{tx}$$

Iteration l=2, ... $N_I$:
Update the soft-demapper output variance for each MIMO stream according to:

$$\tilde{\sigma}_n^2 = \beta_{Q_n} f_{Q_n}^{DeMap}(SNR_n^{Eq,(l-1)})\sigma_n^2, n=1,\ldots,N_{tx}$$

Update the equalizer output SNR values according to the selected equalizer design using the new variance values. This provides a new set of $SNR_n^{Eq,(l)}$, n=1, ..., $N_{tx}$ values to be used for the next iteration.

Output:
The final result corresponds to the effective SNR per stream:

$$SNR_n^{Eff} = SNR_n^{Eq,(N_I)}, n=1,\ldots,N_{tx}$$

The $\beta_{Q_n}$ terms are correction factors which are modulation dependent. When considering the output of the equalizer, the impact of the interfering streams on the error probability is different from the impact of Gaussian noise with the same noise power. The $\beta_{Q_n}$ terms are introduced as correction factors accounting for this difference. For example, the $\beta_{Q_n}$ factors can be set according to the ratio between the maximum power and the mean power of each constellation. In the 3GPP LTE system where QPSK, 16-QAM and 64-QAM modulations are used, these factors can be set equal to:

$$\beta_{QPSK}=1$$

$$\beta_{16-QAM}=1.8$$

$$\beta_{64-QAM}=2.33$$

In an alternative embodiment the $\beta_{Q_n}$ factors can be further optimized to achieve higher accuracy of the performance precision. For example, they can be made iteration dependent or could be adapted to the SNR at the input to the soft demapper. Additionally, the optimization of the $\beta_{Q_n}$ factors could also be adapted to the number of transmit/receive antennas.

Figure 5:
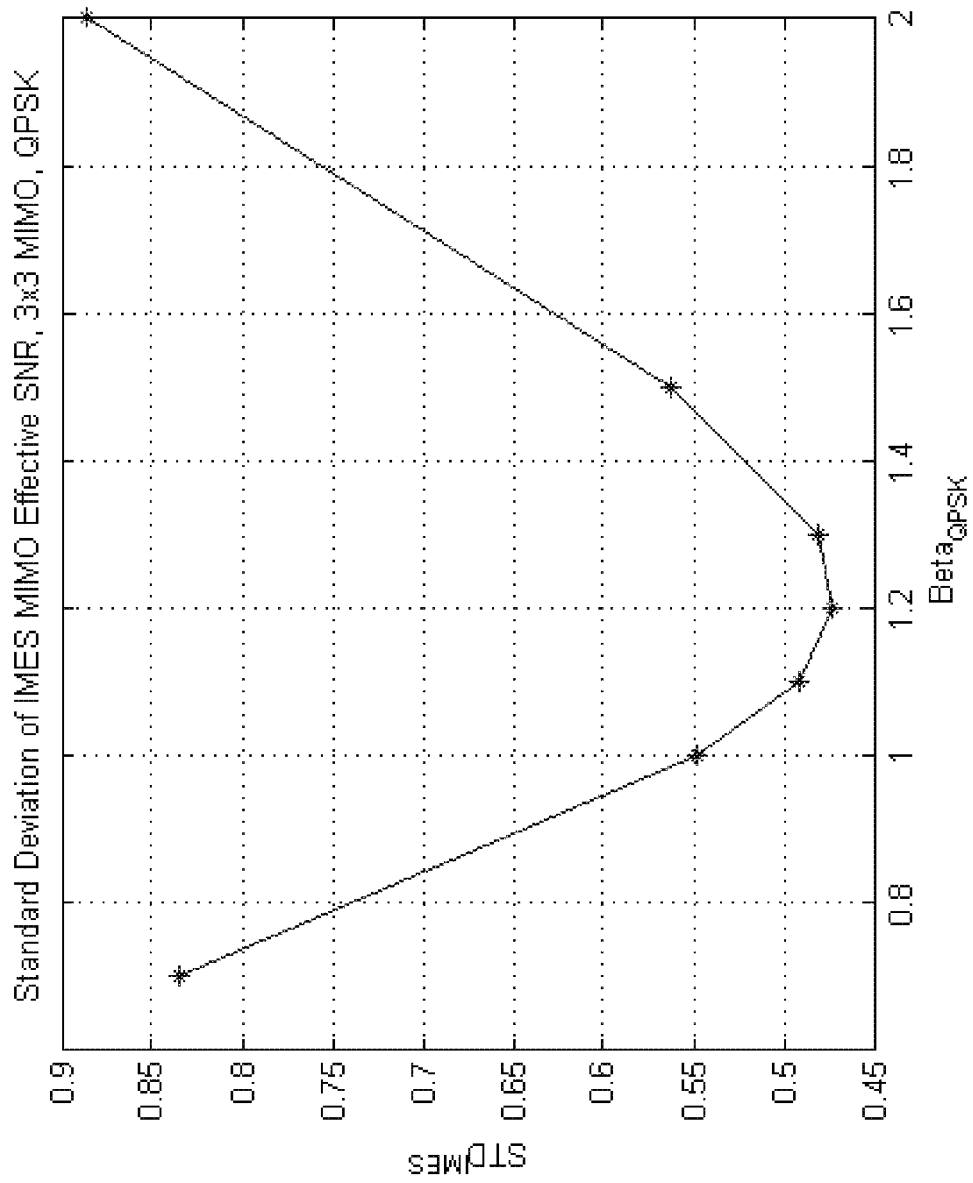
FIG. 5 shows how the β parameters used in the IMES algorithm can be optimized to reduce the standard deviation of the Effective SNR error for a 3×3 MIMO channel with a quadrature phase-shift keying (QPSK) input constellation for all streams.

It is possible to extend the optimization of the β factors to cover all the combinations of number, of transmit and receive antennas and input constellation modulation orders. Furthermore, the optimization of the β factors can be made dependent on the iteration number and/or the soft-demapper SNR input. An example of the optimization of β factors is shown in FIG. 5 where the standard deviation of the error on the effective SNR for a 3×3 MIMO channel with QPSK input constellations is given for different values of $\beta_{QPSK}$. The effective SNR error is calculated with respect to the equivalent SNR of an AWGN channel with the same BER. From FIG. 5 we can see that the optimal value for $\beta_{QPSK}$ that minimizes the mean square error is $\beta_{QPSK}=1.2$.

The number of iterations to be performed $N_I$ is a design parameter which allows complexity to be traded off against performance prediction accuracy. However, a small number of iterations are usually sufficient to achieve a good accuracy of the performance prediction. Fewer than five iterations will in most cases lead to a very accurate estimate.

It should be noted that the number of iterations doesn't have to be fixed and could be varied according to characteristics of the propagation channel. It would also be possible to track the evolution of the effective SNR values across the different iterations and stop the iteration loop once the values are deemed to have sufficiently converged. This could be achieved very easily, for example, by calculating the difference in SNR estimates generated in two consecutive iterations and stop the estimation process once the absolute value of this difference falls below a given threshold.

The UWMF model can be used to predict the performance of the MIMO MLD receiver using the IMES approach. It will be obvious to the skilled artisan that the IMES performance prediction approach isn't limited to the use of the UWMF equalizer and that a number of alternative solutions could be considered. For example, it would be possible to use an LMMSE model for the equalizer 310 and then derive the equalizer SNR estimation unit 410 accordingly. In such a case, the SNR values would be calculated using the following formula:

$$SNR_n^{Eq} = \frac{1}{1 - \sigma_n^2 h_n^H \left( \overline{H}_n \sum_n \overline{H}_n^H + \sigma_v^2 h_n h_n^H + \sigma_v^2 I \right)^{-1} h_n}$$  Equation 15

Figure 6:
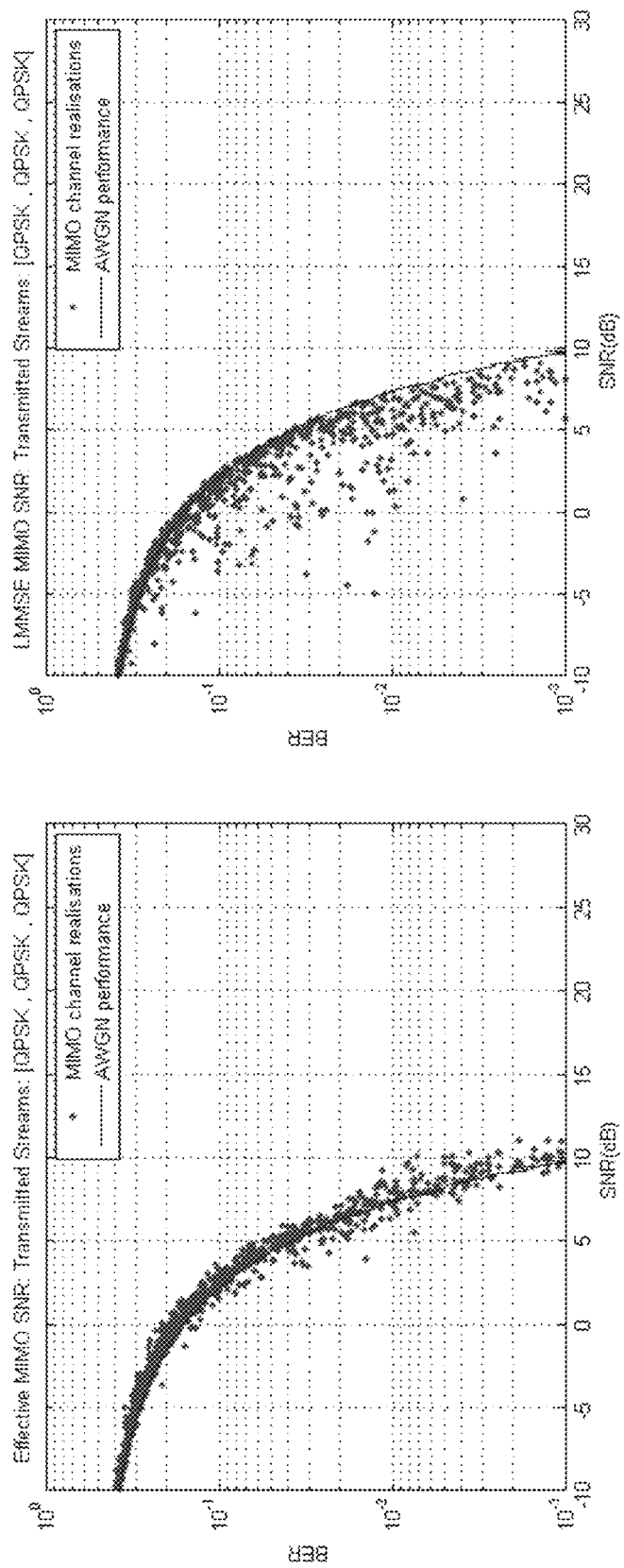
FIG. 6 shows a comparison of the results for IMES and LMMSE based BER predictions of the MLD for a 3×3 MIMO channel with a quadrature phase-shift keying (QPSK) input constellation for all streams.

Compared to the techniques proposed by prior-art solutions, the invention is more general in its applications and also offers benefits in terms of computational complexity. FIG. 6 shows a comparison between the SNR estimated from the LMMSE equalizer SNR formula and the effective SNR obtained with the current invention. The results are presented for a MIMO channel with 3 transmit antennas and 3 receive antennas where all the MIMO streams are transmitted with a QPSK modulation. The results presented in these figures were obtained by running multiple tests over random realisations of a MIMO propagation channel and measuring the actual BER in each realisation assuming perfect knowledge of the transmitted bits. For each realisation, the effective SNR was estimated using both the IMES approach as well as the LMMSE SNR formula. These multiple instances of measured BER and estimated SNR values are then plotted and can be compared against the known theoretical BER performance curve for the AWGN channel. Each instance of measured BER and estimated SNR value is represented as a single dot in FIG. 6. It can be seen from this figure that the SNR values estimated with the IMES approach have a significantly lower variance than those derived from the LMMSE formula. The values from the IMES estimation are also much closer to the theoretical AWGN performance curve.

Using the IMES approach it is therefore possible for the receiver to predict the BER that will be achieved in a given MIMO channel. The set of effective SNR values calculated with the IMES approach provide estimates of the SNR in a theoretical AWGN channel for which the demodulation performance would be identical to that experienced in the MIMO channel. The demodulation performance in AWGN channel is known as it can be determined either theoretically or through simulations and can characterised by curves expressing the BER as a function of the SNR. It is therefore possible to estimate the BER from the value of these curves calculated at the SNR point estimated by the IMES approach. These AWGN BER curves, which can also be referred to as BER mapping functions, will be dependent on the modulation scheme used by the transmitter. It is possible to extend this approach in order to estimate other metrics of the receiver performance. For example, it is possible to replace the BER mapping functions with BLER mapping functions to enable the receiver to estimate the BLER. Such BLER mapping functions will typically be dependent on both the modulation scheme and the error correction coding rate of the transmission format.

In wireless communication systems using OFDM signalling, the multiple effective SNR per stream values which are calculated for the different subcarrier using the IMES method described herein, can be mapped to a single effective SNR value for each MIMO stream using known techniques such as MMIB, RBIR or EESM. The resulting value characterizes the performance across the entire signal bandwidth for each MIMO stream. These techniques have originally been designed for wireless communication systems which didn't include MIMO processing but can be combined with the IMES method since this approach generates separate effective SNR values for the different MIMO streams. The mapping of the multiple MIMO effective SNR values into a single overall SNR averages the errors present in the individual effective SNR values. Since the IMES method exhibits a very small estimation bias, the averaging will then greatly improve the estimation accuracy. By comparison, the large bias associated with the LMMSE SNR estimation method and which can be observed from the results presented in FIG. 6 will limit the averaging gain and will lead to a poorer overall accuracy.

Figure 7:
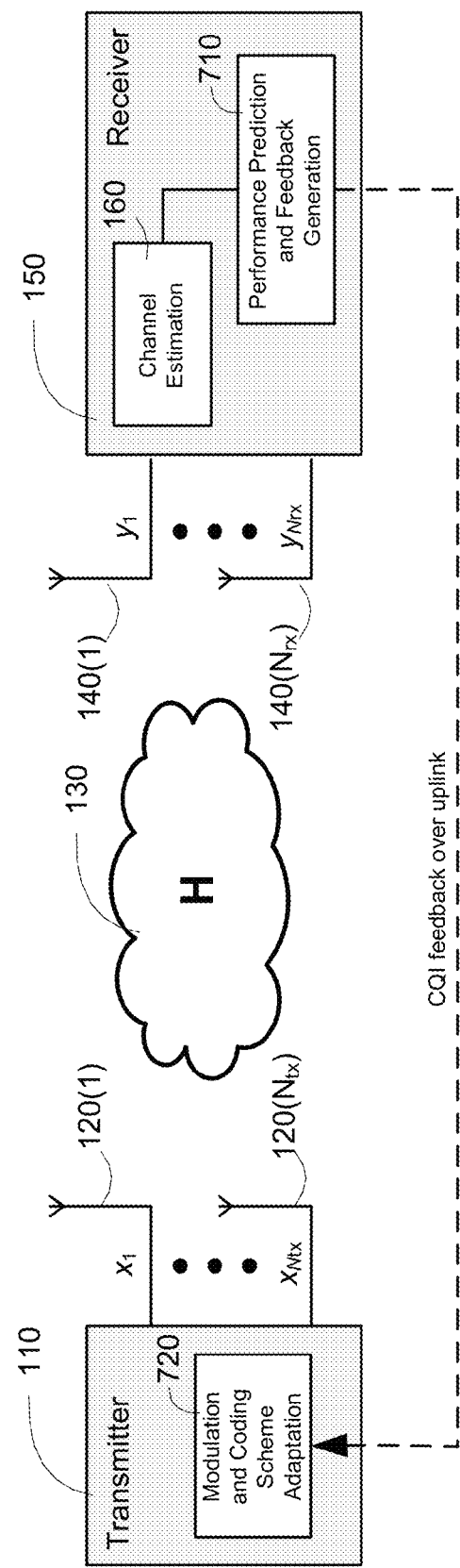
FIG. 7 shows a simplified block diagram of a typical MIMO system highlighting the feedback generation in the receiver.

FIG. 7 shows a simplified block diagram illustrating the use of the techniques disclosed herein for the feedback generation in wireless communication systems with link adaptation. The transmitter 110 and receiver 150 comprise a plurality of antennas 120(1)-120($N_{tx}$) and 140(1)-140($N_{rx}$) respectively communicating over an $N_{rx} \times N_{tx}$ MIMO channel H 130 as in FIG. 1. The channel estimation samples and noise covariance matrix generated by unit 160 are used by the MIMO performance prediction and feedback generation unit 710. The generated feedback can be used by an Evolved Node B (eNode-B) for downlink scheduling decisions as well as for the adaptation of the transmission format to the propagation channel. The feedback provided to the transmitter modulation and coding scheme adaptation 720 unit is usually in the form of CQI values, with each CQI value corresponding to an entry in a table of transmission formats, also referred to as CQI table. The different entries in the CQI table are typically each defined by a modulation and coding scheme.

The CQI table is very often constructed in a way such that increasing indices correspond to increasing SNR requirements and increasing throughput, 'Thrg', values. Such property can be expressed mathematically as follows:

If $CQI1 < CQI2$ then $Thrg(CQI1) < Thrg(CQI2)$

Furthermore, the CQI table is usually organized such that it can be split into groups of contiguous entries, where the same modulation scheme is used for the different entries within one such group. The order of the modulation scheme used in the different groups also typically increases with the CQI table index. The CQI table defined by the 3GPP LTE standard satisfies these different constraints and is shown for illustrative purposes in FIG. 8. It can be seen that the spectral efficiency, expressed in bit/s/Hz and shown in the fourth column increases with the CQI index. It can also be seen that the different entries can be grouped according to their modulation scheme into 3 separate sets. The first group for CQI indices 1 to 6 corresponds to the QPSK modulation with a modulation order of 2. The second group for CQI indices 7 to 9 is associated with the 16QAM modulation and a modulation order of 4. Finally, the third group for CQI indices 10 to 15 uses the 64QAM modulation with a modulation order of 6.

These properties of the CQI table can be used to reduce the computational complexity of unit 710 when using the effective SNR values to identify the CQI value to be fed-back to the transmitter.

The MIMO performance prediction and feedback generation unit 710 needs to identify one CQI value for each MIMO stream corresponding to a transmission format which would satisfy requirements in terms of demodulation reliability and transmission efficiency. For example, unit 710 may identify the transmission format which provides the best spectral efficiency whilst still guaranteeing a BLER of less than 10% at the receiver. The first step performed by unit 710 is to generate a set of effective SNR values for the different MIMO streams using the IMES approach presented in this document. These SNR values are then used in order to generate the CQI information to be fed-back to the transmitter.

The effective SNR values are calculated using the IMES approach presented in this document. This MIMO effective SNR calculation maps $\mathcal{H}$, $R_v$ and S into a set of effective SNR per stream and can be mathematically expressed as:

$$(SNR_0, SNR_1, \ldots, SNR_{Ntx-1}) = \text{MIMOEffectiveSNR}(\mathcal{H}, R_v, S).$$

$S = (Q_1, Q_2, \ldots, Q_{Ntx})$ defines the modulation order for the constellations used by the multiple MIMO streams.
It should be noted, that for systems where several parallel channels are encoded together as is the case for OFDM, the MIMOEffectiveSNR function refers to the IMES method applied per subcarrier, combined with the mapping of the multitude IMES effective SNR across subcarriers into a single effective SNR per stream as proposed earlier.

In order to simplify the description, it is assumed that the different modulation schemes have different modulation orders. It is therefore possibly to uniquely identify each modulation scheme from its modulation order. It will however be clear to the skilled artisan that the application of the techniques presented herein isn't restricted to such cases and that it would be straightforward to extend these techniques to cover systems where multiple modulation schemes are defined with the same modulation order.

In the case of jointly encoded streams, the set of possible inputs could be constrained to have the same constellation over the encoded streams. Additionally the number of calculated final effective SNR and CQI values could be reduced by mapping several effective SNR, of the streams which were encoded jointly, into a single value using the existing mappings such as MMIB, RBIR, or EESM. Both constraints on the input constellations and final CQI feedback have an impact on the search algorithm presented here. However for simplicity we present the general case of independently coded streams.

In order to generate the CQI feedback, unit 710 uses the calculated effective SNR values to find the set of transport formats across the multiple MIMO streams which will provide the best overall spectral efficiency, or equivalently the best overall throughput, under the selected demodulation performance constraint. This constraint could, for example, be expressed as a maximum BLER value that shouldn't be exceeded. It should be noted that the overall throughput can be calculated as the combination of the throughput on the different individual streams and hence the maximum overall throughput is achieved when the throughput of each MIMO stream has been maximised.

A direct implementation of the CQI feedback generation would be extremely complex as it would require an exhaustive search across all possible combinations of modulation schemes for the different MIMO streams. Hence, such an approach would require $(Q_1 \times Q_2 \times \ldots \times Q_{Ntx})$ sets of effective SNR values to be calculated. For each set of effective SNR values corresponding to a possible combination of modulation, an effective SNR value is calculated for each MIMO stream using the IMES approach presented in this document. For a given combination S, it is then possible to calculate for each stream the best entry in the CQI table which satisfies the minimum performance requirement. For stream n with a modulation order $Q_n$ and effective SNR value $SNR_n$, this best entry in the CQI table will be expressed as $CQI_n = \text{CQImapping}(SNR_n, Q_n)$. Note that this mapping from the effective SNR value and modulation order can easily be generated from the known AWGN channel performance characteristics of the given modulation scheme.

It can easily be understood that such an exhaustive search would be extremely complex to implement as the number of tests to perform and the number of effective SNR values to calculate is large. An approach which makes use of properties of the CQI table in order to reduce the implementation complexity will now be described.

The first property of the CQI table which can be exploited is that within each modulation group, increasing indices correspond to higher spectral efficiency and hence higher SNR requirements to achieve the desired demodulation performance. Hence, for each modulation scheme, it is possible to calculate a minimum SNR value corresponding to the SNR required to meet the target demodulation performance for the first entry in this CQI modulation group. This minimum SNR value will be denoted MinSNR(Q) for the modulation scheme with modulation order Q. A constellation combination S can then only be a valid combination when all the effective SNR values for the different streams exceed the minimum SNR values associated with these different modulation schemes.

The proposed algorithm for the CQI report search initially assumes that the same constellation is used for all the input streams. It is usually best to start with the middle table constellation $Q_{mid}$ for all streams in order to reduce the complexity. For the 3GPP LTE system, this corresponds to assuming a 16-QAM modulation for the different MIMO streams. This combination is then tested and if it is found to be valid, i.e. if it allows the minimum demodulation performance target to be achieved, the corresponding throughput is used to initialise the best throughput value to be updated during the search over the different modulation combinations. These different steps can be expressed in pseudo-code as follows:

---

Calculate the MIMO effective SNR values for the different streams
$(SNR_1, SNR_2, \ldots, SNR_{Ntx}) = \text{MIMOEffectiveSNR}(H, R_v, S)$
for $S = (Q_{mid}, Q_{mid}, \ldots, Q_{mid})$
Order the different streams according to the calculated SNR values, i.e.
identify indices $(K_1, K_2, \ldots, K_{Ntx})$ such that
$SNR_{K_1} \leq SNR_{K_2} \leq \cdots \leq SNR_{K_{Ntx}}$.
If $(SNRK_1 \geq \text{MinSNR}(Q_{mid}))$:
Define
$CQIsMax = [\text{CQImapping}(SNR_1, Q_{mid}), \ldots, \text{CQImapping}(SNR_{Ntx}, Q_{mid})]$
And
$ThrgMax = Thrg(CQIsMax) = Thrg(\text{CQImapping}(SNR_1, Q_{mid})) + \ldots + Thrg(\text{CQImapping}(SNR_{Ntx}, Q_{mid}))$.
Else:
Define
$CQIsMax = [0, \ldots, 0]$
And
$ThrgMax = 0$

---

Unit 710 then needs to search for the maximum throughput over the set of remaining modulation combinations $S = (Q_1,$ $Q_2, \ldots, Q_{Ntx}$). For each constellation combination S, the processing steps to be implemented can be described with the pseudo-code that follows:

```
Calculate the MIMO effective SNRs:
(SNR₁, SNR₂, ..., SNR_Ntx ) = MIMOEffectiveSNR(H, R_v ,S)
If (SNR₁ ≥ MinSNR(Q₁), SNR₂ ≥ MinSNR(Q₂), ..., SNR_Ntx ≥
MinSNR(Q_Ntx) ) and (
ThrgMax(S) > ThrgMax)
CQIsMax = [CQImapping(SNR₁, Q₁), ..., CQImapping(SNR_Ntx, Q_Ntx)]
ThrgMax = Thrg(CQIsMax)
```

The CQI feedback corresponds to CQIsMax which is composed, in this case, of N CQI indices associated with the different MIMO streams.

The search over the set of possible modulation combinations $S=(Q_1, Q_2, \ldots, Q_{Ntx})$ can be done in an efficient way by using information on the history of the search and the following properties that can be derived from the structure of the CQI table:

Property 1:
If $S^{(1)}=(Q_1^{(1)}, Q_2^{(1)}, \ldots, Q_{Ntx}^{(1)})$ has been tested and found to be valid, i.e. ($SNR_1 \geq MinSNR(Q_1^{(1)})$, $SNR_2 \geq MinSNR(Q_2^{(1)})$, ..., $SNR_{Ntx} \geq MinSNR(Q_{Ntx}^{(1)})$) for ($SNR_1$, $SNR_2$, ..., $SNR_{Ntx}$)=MIMOEffectiveSNR(H, $R_v$, $S^{(1)}$) then any input constellation combination $S^{(2)}=(Q_1^{(2)}, Q_2^{(2)}, \ldots, Q_{Ntx}^{(2)})$ with a strictly lower constellation combination order ($Q_1^{(2)} < Q_1^{(1)}$, $Q_2^{(2)} < Q_2^{(1)}$, ..., $Q_{Ntx}^{(2)} < Q_{Ntx}^{(1)}$) will lead to a lower throughput, and $S^{(2)}$ does not have to be tested.

Property 2:
If $S^{(1)}=(Q_1^{(1)}, Q_2^{(1)}, \ldots, Q_{Ntx}^{(1)})$ has been tested and found to be invalid i.e. one of the $SNR_n$ ($1 \leq n \leq N$) is invalid ($SNR_n < MinSNR(Q_n^{(1)})$): then any input constellation combination $S^{(2)}=(Q_1^{(2)}, Q_2^{(2)}, \ldots, Q_{Ntx}^{(2)})$ with a higher constellation combination order ($Q_1^{(2)} \geq Q_1^{(1)}$, $Q_2^{(2)} \geq Q_2^{(1)}$, ..., $Q_{Ntx}^{(2)} \geq Q_{Ntx}^{(1)}$) will be invalid hence $S^{(2)}$ does not have to be tested.

Property 3:
If $S=(Q_1, Q_2, \ldots, Q_N)$ has a maximum throughput that is lower than the maximum throughput that has so far been achieved during the search, $ThrgMax(S) \leq Thrg_{Max}$, then the input constellation combination S does not have to be tested.

The different properties presented above can be used in order to organize the search over the combinations of modulation schemes for the different MIMO streams in an efficient manner. By making use of these properties, it is possible to discard combinations which would either be invalid or which would be obviously non-optimum, thereby reducing the total number of combinations that need to be tested. This can lead to a significant reduction in the computational complexity as this makes it possible to limit the number of effective SNR calculations that need to be performed.

Figure 9:
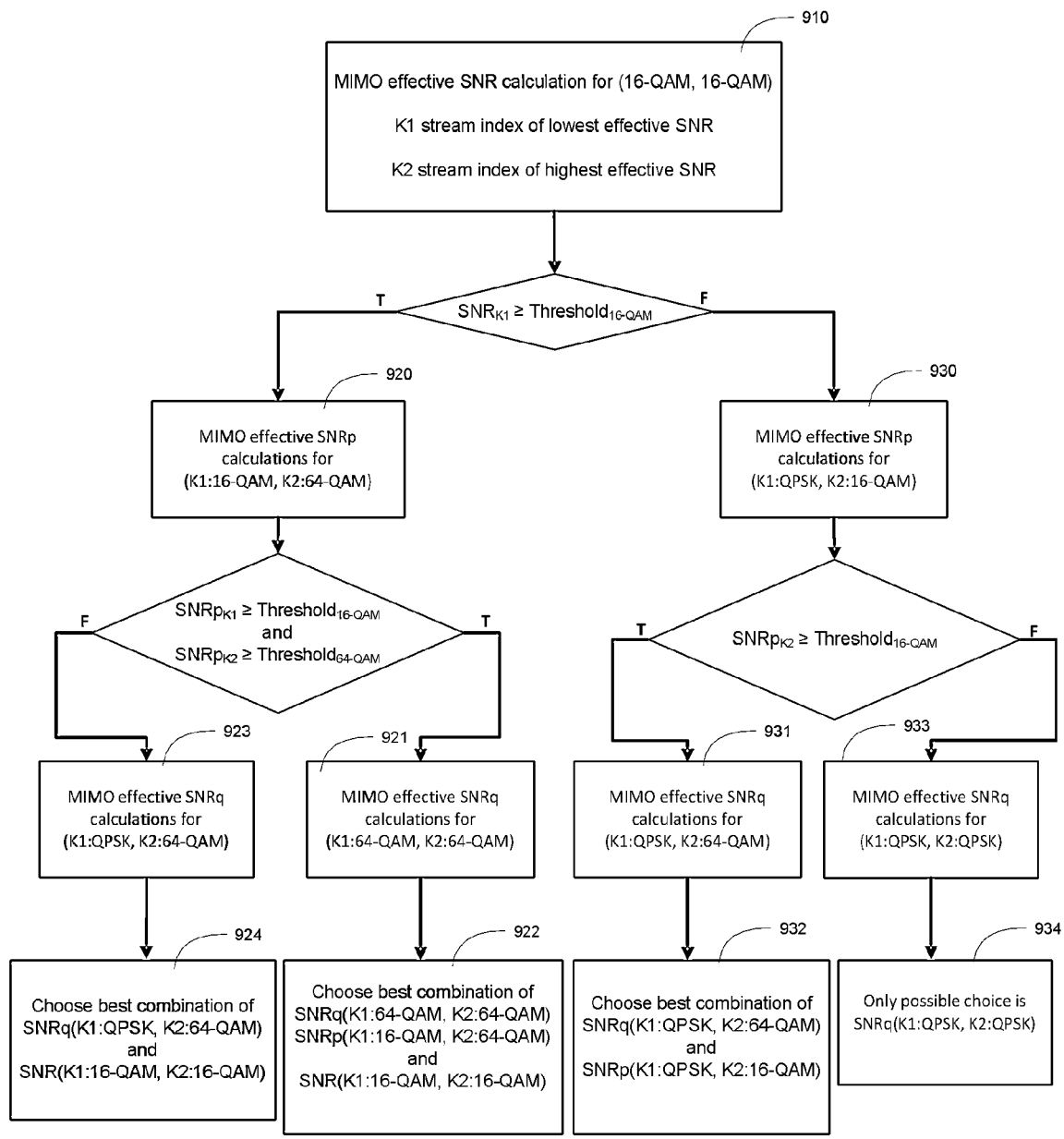
FIG. 9 shows a flow chart of the CQI report algorithm search tree.

As an example of the complexity reduction that can be achieved by the proposed search approach which takes advantage of the CQI table structure, FIG. 9 shows a flow chart of the CQI report search tree for the maximum throughput input constellation combination applied to the 3GPP LTE. In the case of two input streams, a maximum of three MIMO effective SNR calculations are performed, each for a different combination of input constellations. If the different properties of the search weren't used, a maximum of nine MIMO effective SNR calculations would be required to exhaustively test all possible combinations of modulation schemes for the two streams. Hence, it can be seen that the proposed approach for the implementation of the CQI search provides significant benefits in terms of implementation complexity.

As stated previously, the method first calculates at 910, the effective SNR for the two streams using the middle table constellation $Q_{mid}$ for both streams, 16-QAM in this case. The two effective SNR values for the two MIMO streams are then arranged in increasing order, $SNR_{K1}$ being the lowest and $SNR_{K2}$ being the highest.

Following the path 910, 920, 921, and 922 through the search tree, it can be seen that the tested constellation combinations for the two streams are:
SNRq($K_1$:64-QAM, $K_2$:64-QAM)
SNRp($K_1$:16-QAM, $K_2$:64-QAM)
SNR($K_1$:16-QAM, $K_2$:16-QAM)
where SNRp and SNRq are the effective SNRs calculated at levels 2 and 3 respectively.

Similarly following the path 910, 920, 923 and 924 through the search tree, it can be seen that the tested constellation combinations for the two streams, that can be compared for best throughput, are:
SNRq($K_1$:QPSK, $K_2$:64-QAM)
SNR($K_1$:16-QAM, $K_2$:16-QAM)

Following the path 910, 930, 931, and 932 through the search tree, it can be seen that the tested constellation combinations for the two streams, that can be compared for best throughput, are:
SNRq($K_1$:QPSK, $K_2$:64-QAM)
SNRp($K_1$:QPSK, $K_2$:16-QAM)

Following the path 910, 930, 933, and 934 through the search tree, it can be seen that the only valid constellation combination for the two streams is:
SNRq($K_1$:QPSK, $K_2$:QPSK)

At stages 922, 924, and 932, the process chooses the tested constellation combination that will provide the best throughput. This is achieved by comparing summations of the throughput of the resulting CQI mapping for SNR, SNRp, and SNRq. The CQI corresponding to the best throughput in then used for the feedback to the eNode-B. In the case of stage 934 there is only one possible choice which can be used for the CQI feedback.

It can be seen from FIG. 9, that only three MIMO effective SNR computations are required to cover all the different possible combinations of modulation schemes for the two MIMO streams. Hence, by exploiting the structure of the CQI table, the proposed approach can achieve a significant complexity reduction over the more straightforward implementation which would exhaustively test all the possible combinations of modulation schemes for the two MIMO streams. It will be obvious to the person skilled in the art that the approach detailed herein for the modulation combination search can easily be extended to MIMO configurations not covered in this document.

Figure 10:
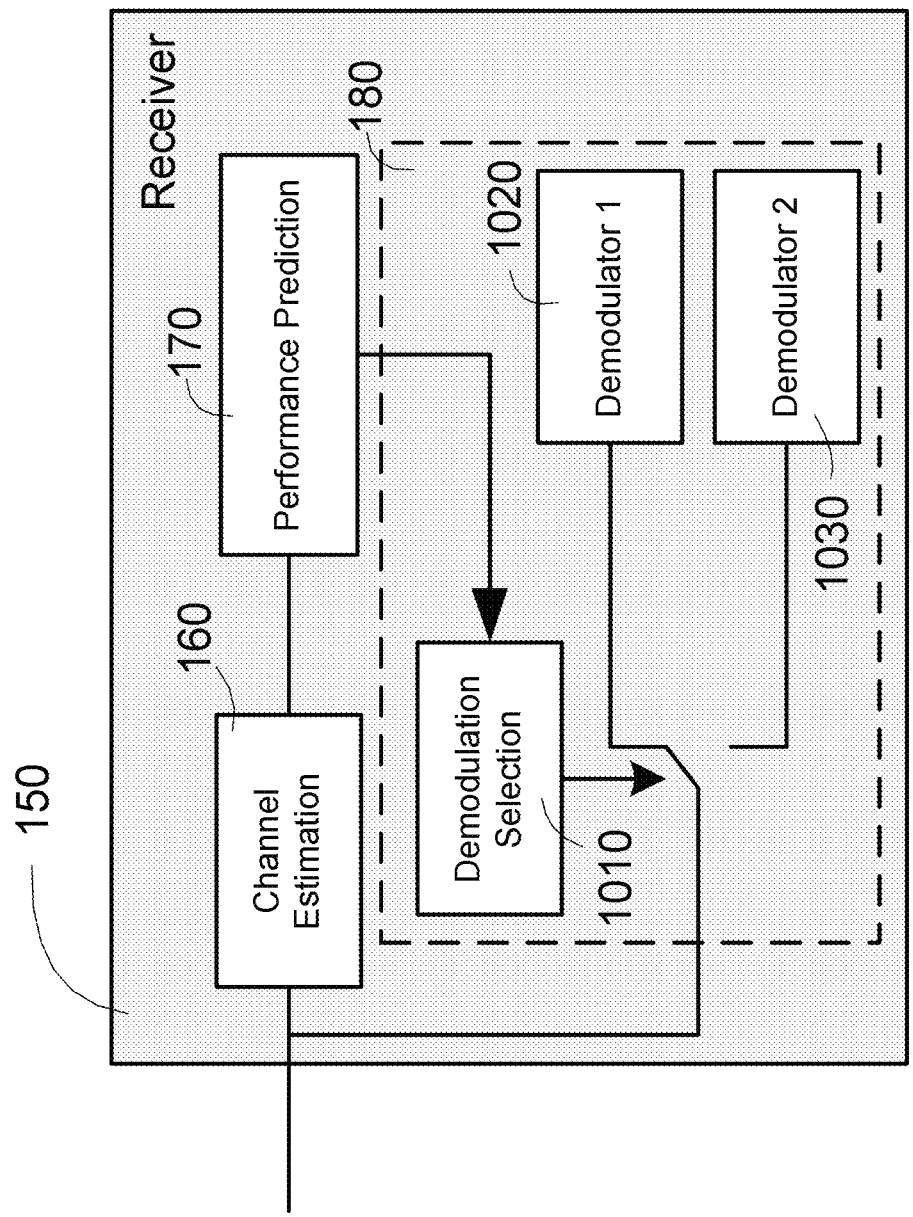
FIG. 10 shows a simplified block diagram highlighting the adaptation of the receiver to the link characteristics by way of demodulator selection.

In an alternative embodiment, the effective SNR produced by the MIMO MLD performance prediction unit can be used to adapt the processing performed by the receiver to characteristics of the propagation link. FIG. 10 presents an example embodiment of such an approach where the processing performed at the receiver varies according to the performance predicted by the IMES.

In FIG. 10, the receiver unit 150 is shown to include 2 different demodulators, namely units 1020 and 1030. These 2 different demodulation units have different characteristics in terms of computational complexity and estimation performance. The selection between these 2 demodulators for the processing of the received signal is performed by unit 1010 using the information provided by the performance prediction unit 170. In one embodiment, the effective SNR values generated by 170 are compared against thresholds in order to decide which of the 2 demodulators should be selected. For example, one of the demodulation units may be optimized for operation in good signal conditions and may take advantage of the favourable conditions to reduce the computational complexity. The demodulation selection unit 1010 would then select this unit when the effective SNR value calculated by 170 is above a threshold. By using such a dynamic approach to the operation of the receiver, it may be possible to achieve power consumption gains by varying the amount of processing which is performed to the link level performance as predicted by the IMES. It should be noted that such an approach isn't limited to the use of two demodulation units as shown in FIG. 10 and can easily be extended to cover a larger number of configurations.

Although the apparatus, system, and method are illustrated and described herein as embodied in one or more specific examples, it is nevertheless not intended to be limited to the details shown, since various modifications and structural changes may be made therein without departing from the scope of the apparatus, system, and method, and within the scope and range of equivalents of the claims. Accordingly, it is appropriate that the appended claims be construed broadly and in a manner consistent with the scope of the apparatus, system, and method, as set forth in the following claims.

What is claimed is:

1. A method for predicting performance of a Maximum Likelihood Detection (MLD) receiver that receives Multiple Input Multiple Output (MIMO) streams; wherein the MLD receiver comprises an equalizer, a soft demapper, and a bit demapper; the method comprising:
    exchanging information between the equalizer and the soft demapper in an iterative way to generate iteratively-derived effective signal to noise ratio (SNR) values based on the MIMO streams received by the MLD receiver, comprising:
        outputting initial SNR values by the equalizer to the soft demapper and to the bit demapper;
        calculating post-observational variances of said MIMO streams by said soft demapper;
        providing the post-observational variances from the soft demapper to the equalizer;
        generating iteratively-derived effective SNR values by the equalizer using the provided post-observational variances from the soft demapper; and
        outputting iteratively-derived effective SNR values by the equalizer to the soft demapper and the bit demapper,
    wherein the MLD receiver generates multiple sets of iteratively-derived effective SNR values for different MIMO streams, and the method further comprises:
        combining the iteratively-derived effective SNR values corresponding to one MIMO stream across the multiple sets of iteratively-derived effective SNR values into a single value representative of the performance across the different MIMO streams.

2. The method of claim 1, wherein said equalizer uses an unbiased whitening matched filter.

3. The method of claim 1, wherein combining of the iteratively-derived effective SNR values across the multiple sets of iteratively-derived effective SNR values is performed using the Mean Mutual Information per Bit (MMIB) approach.

4. The method of claim 1, wherein the method is used to adapt a process performed by the MLD receiver to retrieve transmitted information.

5. The method of claim 1, wherein the method is used to generate feedback information to select a transmission format to be applied by a transmitter.

6. The method of claim 5, wherein each of said MIMO streams has a transmission format defined in a table, and said feedback information comprises indices of the table entries, and generating the feedback information comprises:
    calculating multiple sets of the iteratively-derived effective SNR values for different combinations of the transmission formats across the MIMO streams.

7. The method of claim 6, wherein said table defines a plurality of transmission formats, each of the transmission formats is characterized by a modulation order and throughput, and a higher modulation order correspond to a higher throughput.

8. The method of claim 7 wherein generating the feedback information comprises:
    testing multiple combinations of said table's entries; and
    minimizing a number of combinations of table's entries to be tested based on organization of said table's entries.

\* \* \* \* \*